United States Patent [19]
Scott et al.

[11] Patent Number: 5,464,887
[45] Date of Patent: Nov. 7, 1995

[54] CROSSLINKED UNSATURATED POLYESTERS AS FLATTING AGENTS IN AQUEOUS ELECTROCOATING COMPOSITIONS

[75] Inventors: Matthew S. Scott, Pittsburgh; Gregory J. McCollum, Hampton Township, Allegheny County; Chester J. Szymanski, McCandless Township, Allegheny County; Craig A. Wilson, Richland Township, Allegheny County, all of Pa.

[73] Assignee: PPG Industries, Inc., Pittsburgh, Pa.

[21] Appl. No.: 225,211

[22] Filed: Apr. 8, 1994

[51] Int. Cl.⁶ ............................. C25D 13/00; C08L 67/06
[52] U.S. Cl. ..................... 523/501; 524/513; 524/539; 204/181.6; 204/181.7; 523/402; 523/403; 523/404
[58] Field of Search ................... 523/403, 415, 523/402, 501, 503, 404; 524/513, 538, 539, 555; 204/181.6, 181.7

[56] References Cited

U.S. PATENT DOCUMENTS

| | | | |
|---|---|---|---|
| 3,455,806 | 7/1969 | Spoor et al. | 204/181.7 |
| 3,663,389 | 5/1972 | Koral et al. | 204/181.6 |
| 3,793,278 | 2/1974 | DeBona | 204/181.7 |
| 3,822,224 | 7/1974 | Gillan et al. | 523/501 |
| 3,839,253 | 10/1974 | Kershaw et al. | 260/29.6 |
| 3,879,314 | 4/1975 | Gunning et al. | 260/2.5 |
| 3,923,704 | 12/1975 | Gunning et al. | 260/2.5 |
| 3,928,157 | 12/1975 | Suematsu et al. | 204/181.7 |
| 3,947,338 | 3/1976 | Jerabek et al. | 204/181.7 |
| 3,947,339 | 3/1976 | Jerabek et al. | 204/181.7 |
| 3,962,165 | 6/1976 | Bosso et al. | 260/29.2 |
| 3,975,346 | 8/1976 | Bosso et al. | 260/29.2 |
| 3,984,299 | 10/1976 | Jerabek | 204/181.7 |
| 4,001,101 | 1/1977 | Bosso et al. | 204/181.7 |
| 4,116,900 | 9/1978 | Belanger | 260/181.7 |
| 4,124,548 | 11/1978 | Gillan et al. | 523/501 |
| 4,134,866 | 1/1979 | Tominaga et al. | 260/181.7 |
| 4,134,932 | 1/1979 | Kempter et al. | 260/831 |
| 4,430,462 | 2/1984 | Jaeger et al. | 523/403 |
| 4,476,261 | 10/1984 | Patzschke et al. | 523/402 |
| 4,483,945 | 11/1984 | Beresford et al. | 521/62 |
| 4,489,174 | 12/1984 | Karickhoff | 523/501 |
| 4,916,019 | 4/1990 | Nakatani et al. | 523/404 |
| 5,331,026 | 7/1994 | Benefiel et al. | 523/415 |

OTHER PUBLICATIONS

"Microvoid Coatings: Pigmented, Vesiculated Beads in Flat Latex Paints", Rod W. Hislop and Peter L. McGinley, Dulux Australia Limited *, vol. 50, No. 642, Jul. 1978.

"Polyesters, Unsaturated", Kirk–Othmer Encyclopedia of Chemical Technology, vol. 18, 3rd Edition, John Wiley & Sons, New York, 1982, pp. 575–594.

Shinto Technology.

Primary Examiner—Peter A. Szekely
Attorney, Agent, or Firm—Linda Pingitore; Dennis G. Millman

[57] ABSTRACT

An aqueous electrocoating composition useful in a method of electrodeposition contains an electrodepositable resin, optionally a curing agent and a microparticulate crosslinked unsaturated polyester flatting agent. The microparticulate flatting agent provides the desired flatting effect without compromising coating properties such as corrosion resistance and flexibility.

26 Claims, No Drawings

CROSSLINKED UNSATURATED POLYESTERS AS FLATTING AGENTS IN AQUEOUS ELECTROCOATING COMPOSITIONS

BACKGROUND OF THE INVENTION

1. Field of the Invention

The present invention relates to electrodepositable coating compositions containing flatting agents and their use in electrodeposition.

2. Brief Description of the Prior Art

Electrodepositable coating compositions, such as, electrodepositable primers typically contain flatting agents to reduce the gloss and impart a dull finish to the cured coating film. Traditionally, these flatting agents have been inorganic pigments and fillers, such as silicas, clays or talcs. Although these materials are effective for this use and relatively inexpensive, they tend to settle out readily and adversely affect final film properties. Clay and talc, in particular, contain various partially soluble contaminants, such as iron, which reduce the corrosion resistance of the electrodepositable coating. In addition, these inorganic materials can have other deleterious effects. For example, clay can detract from the flexibility of the cured film while certain silicas can be toxicologically undesirable.

Flatting agents made from organic materials are well known in the art. Typical organic compounds which are employed are acrylic and polyester polymers. The disadvantage of the polymeric acrylic flatting agents is their high cost relative to polymeric polyesters. Crosslinked polyesters, such as those described in U.S. Pat. Nos. 3,879,314, 3,923,704 and 4,483,945 are well known as matting agents for latex paints. These crosslinked polyesters are suspensions of polymeric particles in an aqueous medium, prepared by suspension polymerization techniques, and as such are highly susceptible to settling, agglomeration or kickout. Moreover, the polymeric particles as prepared are often of dimensions which hamper formulation into coatings or cause filtration problems during paint production, such as filter plugging. In addition, milling of the particles to reduce size can be difficult due to the nature of the particle. Such organic flatting agents have not been used in electrodepositable coating compositions heretofore.

It would therefore be desirable to have an organic flatting agent such as the crosslinked polyesters that overcomes the particle size and stability drawbacks mentioned above, which when incorporated into electrodepositable coating compositions provides flatting comparable to conventional inorganic pigments without compromising film properties such as corrosion resistance and flexibility.

SUMMARY OF THE INVENTION

In accordance with the present invention, there is provided an aqueous electrocoating composition comprising an electrodepositable water dispersible polymer, optionally a curing agent adapted to crosslink the water dispersible polymer and a microparticulate crosslinked unsaturated polyester in an amount effective to provide flatting of a cured film of the aqueous electrocoating composition on a substrate.

Also provided is an aqueous cationic electrocoating composition comprising a cationic electrodepositable water dispersible polymer, optionally a curing agent adapted to crosslink the water dispersible polymer and the microparticulate crosslinked unsaturated polyester flatting agent as described above.

Also provided is a method of electrodeposition and a coated article produced therefrom.

DETAILED DESCRIPTION OF THE INVENTION

The electrocoating compositions of the present invention contain a water dispersible film forming polymer, optionally a curing agent, and a microparticulate crosslinked unsaturated polyester as a flatting agent. The microparticulate crosslinked unsaturated polyester flatting agent is particularly advantageous in that it provides flatting comparable to conventional flatting agents, such as silicas, clays and talcs without detrimentally affecting coating properties such as flexibility and corrosion resistance as mentioned above.

As stated above, the flatting agent of the present invention is a microparticulate crosslinked unsaturated polyester. In the preparation of the flatting agent, first an unsaturated polyester is prepared and subsequently crosslinked as described in detail below.

An unsaturated polyester is prepared by techniques well known in the art from an ethylenically unsaturated polycarboxylic acid and a polyhydric alcohol. Suitable ethylenically unsaturated polycarboxylic acids include dicarboxylic acids such as maleic acid, fumaric acid, aconitic acid, mesaconic acid, citraconic acid, itaconic acid and halo and alkyl derivatives of such acids and the like. The anhydrides of these acids, where the anhydrides exist are, of course, embraced under the term "acid". The preferred acid is fumaric acid with maleic anhydride as the preferred anhydride.

Saturated polycarboxylic acids, preferably dicarboxylic acids can be utilized in combination with the unsaturated polycarboxylic acid or anhydride in the preparation of the unsaturated polyester resin. Such acids increase the length of the polyester without adding additional unsaturation. Examples of useful dicarboxylic acids which are either saturated or only aromatically unsaturated include: succinic acid, adipic acid, suberic acid, azelaic acid, sebacic acid, phthalic acid, isophthalic acid, terephthalic acid, tetrachlorophthalic acid, hexachloroendomethylenetetrahydrophthalic acid, and the like. As in the case of the ethylenically unsaturated acids, the anhydrides of these acids, where the anhydrides exist, are embraced in the term "acid". Furthermore, for purposes of the present invention, the aromatic nuclei of such acids as phthalic acid are generally regarded as saturated since the double bonds do not react by addition, as do ethylenic groups. Therefore, wherever the term "saturated dicarboxylic acid" is utilized, it is to be understood that the term is meant to include the aromatic dicarboxylic acids. Such "saturated dicarboxylic acids" may also be referred to as "non-olefinically unsaturated" polycarboxylic acids.

The polyhydric alcohols (polyols) useful in preparing the unsaturated polyester include: ethylene glycol, diethylene glycol, triethylene glycol, polyethylene glycol, propylene glycol, dipropylene glycol, polypropylene glycol, neopentyl glycol, butanediol, hexanediol, cyclohexanedimethanol, pentaerithyritol, trimethylolpropane, trimethylolethane, and the like. The preferred polyols for the purpose of this invention have a molecular weight of less than 2,000 and consist essentially of carbon, hydrogen and oxygen. The polyhydric alcohols are generally employed in an equal molar ratio to the total acid components, or in a slight excess as, for example, about 10 to 12 mole percent excess. Further details concerning the preparation of the unsaturated polyester are not felt to be necessary since the synthetic techniques are well appreciated by those skilled in the art. If further details are desired, reference may be made to the *The Kirk-Othmer Encyclopedia of Chemical Technology*, Volume 18, 3rd Edition, John Wiley and Sons, New York, 1982, pages 575–594.

The unsaturated polyester prior to crosslinking generally has a weight average molecular weight of from about 1,000 to about 50,000, preferably about 1,500 to about 10,000, and more preferably from about 2,000 to about 5,000 as determined by gel permeation chromatography using polystyrene as a standard. The unsaturated polyester generally has an acid value of from about 20 to 75 milligrams (mg) of potassium hydroxide (KOH) per gram (g) of sample, preferably from about 25 to 35 mg KOH/g, as determined by conventional potentiometric titration techniques well known in the art.

Once prepared the unsaturated polyester is crosslinked using a polymerizable ethylenically unsaturated monomer to form the microparticulate flatting agent. Suitable ethylenically unsaturated monomers include: styrene, alpha-methyl styrene, divinyl benzene, vinyl acetate, allyl acetate, diallyl phthalate, diallyl succinate, diallyl adipate, diallyl sebacate, methyl acrylate, methyl methacrylate, hexyl acrylate, octyl acrylate, octyl methacrylate, dimethylaminoethyl methacrylate, trimethylolpropane triacrylate, glycidyl methacrylate, hydroxypropyl methacrylate, acrylic acid, diallyl itaconate, diallyl maleate, diallyl fumarate, triallyl cyanurate and the like. Mixtures of crosslinkers can be used. The preferred monomers are liquid materials, soluble in the polyester components. Such monomers should preferably be free of non-aromatic carbon-carbon conjugated double bonds. Preferably a mixture of styrene and dimethylaminoethyl methacrylate is used as the crosslinker.

A variety of commercially available unsaturated polyesters can be used in preparing the flatting agent of the present invention such as the AROPOL series of materials commercially available from Ashland Chemical, the TRITHERM materials from P.D. George Company or the ROSKYDAL materials from Miles, Inc..

The amount of crosslinking monomer employed can vary over a wide range but usually the proportion will range from about 2 percent by weight to about 98 percent by weight, preferably from about 25 percent by weight to about 75 percent by weight, more preferably from about 40 percent by weight to about 60 percent by weight, the percentage based on the total weight of the unsaturated polyester and the crosslinking monomer.

The crosslinking of the unsaturated polyester to produce the microparticulate flatting agent is conducted by a solution polymerization and precipitation technique. The polymerization is conducted in a solvent which is a mixture of water and an alcohol that is easily removed by distillation such as methanol, ethanol, and isopropyl alcohol. Although anhydrous alcohol can be used, mixtures of water and alcohol are more economical and easier to remove by distillation. Preferably ethanol is utilized as the alcohol at a ratio of about 80 percent ethanol to about 20 percent water. Although not required, the crosslinking can be conducted under inert reaction conditions, for example using a nitrogen atmosphere. Unsaturated polyester crosslinking monomers detailed above are added to the refluxing solvent typically at a temperature from about 60° C. to about 80° C. over a time period of from about 5 to about 120 minutes, preferably about 30 minutes. Simultaneously, an alcohol solution of free radical initiating catalyst such as peroxides, bisdiazo initiators or others well known to those skilled in the art, is added to the refluxing solvent. Preferably, the free radical initiating catalyst t-butylperoxypivalate is used. The amount of catalyst can vary, but typically ranges from about 1 percent to about 10 percent by weight based on total monomer weight.

An accelerator is preferably used to facilitate rapid polymerization during crosslinking. A variety of conventional materials are useful, although typically tertiary amines are used. However, these materials can result in contamination of the final electrocoating bath, therefore, it is preferred to incorporate the amine functionality as a crosslinking monomer which is consumed during the crosslinking reaction. An example of such a monomer which is preferred herein is dimethylaminoethyl methacrylate. The microparticulate crosslinked unsaturated polyester begins to form almost immediately as a white precipitate. Although not intending to be bound by any theory, it is believed the polymerization begins in solution and can continue after precipitation. The polymerization results in the depletion of the unsaturation of the polyester backbone by reaction with the crosslinking monomer or mixture of monomers.

The microparticulate crosslinked polyester is then diluted with water resulting in an alcohol/water ratio of about 20 percent to about 80 percent, preferably for example, about 20 percent ethanol to about 80 percent water. The solvent is then removed by distillation followed by centrifugation to recover the microparticulate crosslinked unsaturated polyester. It should be understood that although centrifugation is preferred, the crosslinked polyester can be recovered simply by settling, followed by decanting the supernatant solvent.

The microparticulate crosslinked unsaturated polyester can be prepared at a total solids content ranging from about 25 percent to about 90 percent, preferably from about 60 percent to about 90 percent, determined at 110° C. for one hour. The choice of alcohol, the amount of water and the particular polymerization conditions can influence the solids content and particle size of the microparticulate crosslinked unsaturated polyester.

The microparticulate crosslinked unsaturated polyester as prepared has a particle size ranging from about 5 microns to about 10,000 microns, preferably about 5 microns to about 1,000 microns, and more preferably from about 10 microns to 500 microns. The particle size is typically determined by light scattering techniques using a particle size analyzer such as the Coulter N4 Sub-Micron Particle Analyzer commercially available from Coulter Instruments.

Microparticulate crosslinked unsaturated polyesters prepared in this fashion are particularly advantageous in that they can be readily milled to a reduced particle size by conventional milling techniques including sand milling, ball milling, roller milling, jet milling, hammer milling and other techniques which are efficiently and economically conducted. The microparticulate crosslinked unsaturated polyesters can be milled to a reduced particle size ranging from about 5 microns to about 30 microns, preferably from about 10 microns to about 20 microns. Microparticulate crosslinked unsaturated polyesters within these particle size ranges are especially advantageous as flatting agents in the aqueous electrodepositable coating composition of the present invention. Microparticulate crosslinked unsaturated polyesters of the invention, when formulated into aqueous electrocoating compositions, are substantially unswelled by the conventional solvents used in these compositions which are detailed below. Moreover, the claimed flatting agents do not detrimentally affect the appearance of electrocoated horizontal surfaces relative to electrocoated vertical surfaces under poor conditions of bath agitation.

The flatting agent of the present invention is present in the claimed aqueous electrocoating compositions in an amount effective to provide flatting of a cured film of the aqueous electrocoating composition on a substrate. By "flatting" is meant the crosslinked polyester is adapted to provide a glossy reduction of at least about 4 percent from the initial gloss of the aqueous electrocoating composition free of gloss reducing pigments measured at 60 degrees according to ASTM Method D523-62T using a Labtron glossmeter commercially available from BYK. Typically, gloss reductions of from about 6 percent to about 50 percent can be achieved with an amount of the claimed flatting agent ranging from about 2 percent to about 10 percent, the percentages based on the weight of film forming polymer and any curing agent present in the electrocoating composition. By "gloss reducing pigments" is meant materials used to provide flatting such as silicas, clays, talcs and other conventional flatting agents. Generally the amount of flatting agent ranges from about 0.5 percent to about 30 percent, preferably from about 1 percent to about 10 percent, and more preferably from about 2 percent to about 5 percent, the percentages based on the total weight of the film forming polymer and any curing agent in the aqueous electrocoating composition.

The electrocoating compositions of the present invention containing the aforedescribed flatting agent are suitable for anionic as well as cationic electrodeposition although cationic electrodeposition is preferred. A wide variety of electrodepositable film forming polymers are known and can be used in formulating the claimed aqueous electrocoating compositions so long as the film forming polymer is "water dispersible" which herein means, adapted to be solubilized, dispersed, or emulsified in water. That is, polymers which can be classified, depending upon their dispersed state, as solution polymers, dispersion polymers or suspension polymers are all suitable for the purposes of the present invention.

The water dispersible polymer is ionic in nature, that is, the polymer will contain anionic functional groups to impart a negative charge or cationic functional groups to impart a positive charge. Water dispersible polymers used in formulating aqueous electrocoating compositions for the anionic electrodeposition coating process must have an anionic functional group, such as, a carboxyl group for rendering the polymer hydrophilic. That is, the polymer is not soluble or dispersible in water in the form of a free acid (or base) but becomes soluble or dispersible to make a stable aqueous solution or dispersion when a sufficient amount of base (or acid) functionality is neutralized. A variety of such carboxylic acid containing polymers are known including, for example, the reaction product or adduct of a drying oil or semi-drying oil fatty acid ester with a dicarboxylic acid or anhydride. Another vehicle comprises a fatty acid ester, unsaturated acid or anhydride reaction products and any additional unsaturated modifying materials which are further reacted with polyol. Another type of vehicle which gives desirable results are the at least partially neutralized interpolymers of hydroxyalkyl esters of unsaturated carboxylic acids, unsaturated carboxylic acid and at least one other ethylenically unsaturated monomer. Still another electrodepositable vehicle of desirable properties comprises an alkyd-amine vehicle, that is, a vehicle containing an alkyd resin and an amine-aldehyde resin. Yet another electrodepositable composition of desirable properties comprises mixed esters of a resinous polyol. These compositions are described in detail in U.S. Pat. No. 3,749,657, in particular column 2, lines 16 to 75, column 8, lines 1 to 75, column 9, lines 1 to 75 and column 10, lines 1 to 13, all of which are incorporated by reference herein.

Anionic electrodeposition is well known and understood by those skilled in the art therefore it is not necessary to include further detailed discussion of suitable polymers and process conditions.

As was mentioned above, aqueous cationic electrocoat compositions as well as the cationic electrodeposition process are preferred in the present invention and will be discussed in detail below.

Water dispersible film forming polymers used in the cationic electrodeposition coating process have a cationic functional group such as a primary, secondary or tertiary amine moiety as a positively chargeable hydrophilic group. Examples of suitable film forming resins include amine salt group containing resins such as the acid-solubilized reaction products of polyepoxides and primary or secondary amines such as those described in U.S. Pat. Nos. 3,984,299 column 3 lines 16 to 68, column 4 and column 5 lines 1 to 3; 3,947,338 column 1 lines 57 to 68, column 2 lines 1 to 64, column 4 lines 31 to 68 and column 5 lines 1 to 29; 3,947,339 column 3 lines 50 to 68, column 4, column 5 and column 6 lines 1 to 31, said patents incorporated by reference herein. Besides the epoxy-amine reaction products, water dispersible film forming polymers can also be selected from cationic acrylic resins such as those described in U.S. Pat. Nos. 3,455,806 and 3,928,157 column 2 lines 30 to 68 and column 3 lines 3 to 21, said patents incorporated by reference herein.

Besides amine salt group containing resins, quaternary ammonium salt group-containing resins can also be employed. Examples of these resins are those which are formed from reacting an organic polyepoxide with a tertiary amine salt. Such resins are described in U.S. Pat. Nos. 3,962,165 column 2 lines 3 to 68, columns 3 through 9 and column 10 lines 1 to 64; 3,975,346 column 1 lines 62 to 68, columns 2 through 6, column 7 lines 1 to 23, column 10 lines 33 to 68, columns 11 through 14 and column 15 lines 1 to 64; and 4,001,101 column 2 lines 37 to 68, columns 3 through 8 and column 9 lines 1 to 19, said patents incorporated by reference herein. Examples of other cationic resins are ternary sulfonium salt group-containing resins and quaternary phosphonium salt group-containing resins such as those described in U.S. Pat. Nos. 3,793,278 and 3,984,922, respectively, said patents incorporated by reference herein. Also, water dispersible film forming polymers which cure via transesterification such as described in European Application No. 12463 can be used. Further, cationic compositions prepared from Mannich bases such as those described in U.S. Pat. No. 4,134,932 can also be used, said patent incorporated by reference herein.

Further suitable water dispersible film forming polymers are those positively charged resins which contain primary and/or secondary amine groups. Such resins are described in U.S. Pat. Nos. 3,663,389; 3,947,339; and 4,116,900. Particularly preferred are positively charged resins which contain primary and tertiary amine groups. In U.S. Pat. No. 3,947,339, a polyketimine derivative of a polyamine such as diethylene triamine or triethylene tetraamine is reacted with a polyepoxide. When the reaction product is neutralized with acid and dispersed in water, free primary amine groups are generated. Also, equivalent products are formed when polyepoxide is reacted with excess polyamines such as diethylene triamine and triethylene tetraamine and the excess polyamine vacuum stripped from the reaction mixture. Such products are described in U.S. Pat. Nos. 3,663,389 and 4,116,900 columns 3 through 5 and column 6 lines 1 to 2, said patents incorporated by reference herein.

The preferred crosslinkers for use in the present invention are blocked organic polyisocyanates. The polyisocyanates can be fully blocked as described in U.S. Pat. No 3,984,299 column 1 lines 1 to 68, column 2 and column 3 lines 1 to 15, or partially blocked and reacted with the polymer backbone as described in U.S. Pat. No. 3,947,338 column 2 lines 65 to 68, column 3 and column 4 lines 1 to 30, which are incorporated by reference herein. By "blocked" is meant that the isocyanate groups have been reacted with a compound so that the resultant blocked isocyanate group is stable to active hydrogens at ambient temperature but reactive with active hydrogens in the film forming polymer at elevated temperatures usually between 90° C. and 200° C. Suitable polyisocyanates include aromatic and aliphatic polyisocyanates, including cycloaliphatic polyisocyanates and representative examples include diphenylmethane-4,4'-diisocyanate (MDI), 2,4- or 2,6-toluene diisocyanate (TDI), including mixtures thereof, p-phenylene diisocyanate, tetramethylene and hexamethylene diisocyanates, dicyclohexylmethane-4,4'-diisocyante, isophorone diisocyanate, mixtures of phenylmethane-4,4'-diisocyanate and polymethylene polyphenylisocyanate. Higher polyisocyanates such as triisocyanates can be used. An example would include triphenylmethane-4,4',4"-triisocyanate, isocycanate (NCO)-prepolymers with polyols such as neopentyl glycol and trimethylolpropane and with polymeric polyols such as polycaprolactone diols and triols (NCO/OH equivalent ratio greater than 1) can also be used. Preferred polyisocyanates are mixtures of diphenylmethane-4,4'-diisocyanate and polymethylene polyphenylisocyanates. Such mixtures are commonly referred to as crude MDI or polymeric MDI. A particularly preferred mixture is available from Miles, Inc. as Mondur MRS 2. The polyisocyanate curing agents are typically utilized in conjunction with the active hydrogen containing water dispersible film forming polymer in amounts ranging from about 10 percent by weight to about 75 percent by weight, the percentage based on the total weight of the resin solids.

The aqueous electrodepositable compositions of the present invention are in the form of a stable aqueous dispersion. The term "dispersion" is believed to be a two-phase transparent, translucent or opaque resinous system in which the resin is in the dispersed phase and the water is in the continuous phase. By "stable" is meant that the dispersion will not readily settle or is easily redispersible if some sedimentation occurs. The average particle size of the resinous phase is generally less than 10 and usually less than 5 microns, preferably less than 0.5 micron. The concentration of the resinous phase in the aqueous medium is usually at least 1 and usually from about 2 percent by weight to about 60 percent by weight based on weight of the aqueous dispersion. When the compositions of the present invention are in the form of resin concentrates, they generally have a resin solids content of about 25 by weight to about 60 percent by weight based on weight of the aqueous dispersion. When the compositions of the present invention are in the form of electrodeposition baths, the resin solids content of the electrodeposition bath is usually within the range of about 5 by weight to about 25 percent by weight based on total weight of the aqueous dispersion.

Besides water, the aqueous medium may contain a coalescing solvent. Useful coalescing solvents include hydrocarbons, alcohols, esters, ethers and ketones. The preferred coalescing solvents include alcohols, polyols and ketones. Specific coalescing solvents include isopropanol, butanol, 2-ethylhexanol, isophorone, 4-methoxypentanone, ethylene and propylene glycol and the monoethyl, monobutyl and monohexyl ethers of ethylene glycol. The amount of coalescing solvent is generally between about 0.01 and about 25 percent and when used, preferably from about 0.05 to about 5 percent by weight based on weight of the aqueous medium.

In some instances, a pigment composition and if desired various additives such as surfactants, wetting agents or catalyst are included in the dispersion. Pigment compositions may be of the conventional types comprising, for example, iron oxides, lead oxides, strontium chromate, carbon black, coal dust, titanium dioxide, talc, barium sulfate, as well as color pigments such as cadmium yellow, cadmium red, chromium yellow and the like. The pigment content of the dispersion is usually expressed as a pigment-to-binder ratio. In the practice of the present invention, the pigment-to-binder ratio is usually within the range of 0.02 to 1:1, The other additives mentioned above are usually in the dispersion in amounts of about 0.01 to about 3 percent by weight based on weight of resin solids. For cationic electrocoating compositions, dispersing agents which should be of the non-ionic or cationic type or a combination of these types may optionally be employed. One type of dispersing agent is the resinous pigment grinding vehicle disclosed in U.S. Pat. No. 4,007,154 to Schimmel et al.

Usually the pigment and dispersing agent are bound together to make a paste and this is blended with a major portion of the vehicle to produce a coating composition.

There may also be included in the coating composition additives such as anti-oxidants, wetting agents, dryers, anti-foaming agents, suspending agents and the like. It is often desirable to include small amounts of water-miscible organic solvents, which may be added to the resinous vehicle to aid in handling and processing. Examples of such solvents are 4-methoxy-4-methyl-pentanone-2, and other solvents such as dioxane and glycol ethers can be used.

In formulating the water-dispersed compositions, ordinary tap water may be employed. However, such water may contain a relatively high level of ions, which, while not ordinarily rendering the electrodeposition process inoperative, may result in variations in the properties of the baths when used for electrodeposition. In such cases, it is often desirable to utilize deionized water from which the free ions have been removed, as by passage through an ion exchange resin.

In the cationic electrodeposition process employing the aqueous coating compositions described above, the aqueous composition is placed in contact with an electrically conductive anode and an electrically conductive cathode, with the surface to be coated being the cathode. Upon passage of the electric current between the anode and the cathode, while in contact with the bath containing the coating composition, an adherent substantially continuous film of the coating composition is deposited on the cathode. This is in contrast to the processes utilizing polycarboxylic acid resins which deposit on the anode.

The conditions under which electrodeposition is carried out are, in general, similar to those used in electrodeposition of other types of coatings. The applied voltage may be varied greatly and can be, for example, as low as one volt or as high as several thousand volts, although typically between 50 volts and 500 volts are employed. Current density is usually between about 1.0 ampere and 15 amperes per square foot and tends to decrease during electrodeposition.

After deposition, the coating is dried or cured at elevated temperatures by any convenient method, such as baking in ovens or with banks of infrared heat lamps. Curing temperatures depend principally on the curing agent employed, and when the curing agent is a blocked isocyanate such as described above, curing is usually accomplished at between 75° C. to 300° C.

The invention will be described further in conjunction with several examples showing the method and practice of the invention. These examples, however, are not to be construed as limiting the invention to their details. All parts and percentages in the examples as well as throughout the specification are by weight unless otherwise indicated.

EXAMPLES

The following examples describe the preparation of a microparticulate crosslinked unsaturated polyester flatting agent according to the present invention, its incorporation into an aqueous cationic electrodepositable coating composition and evaluation.

Example A

Preparation of the Unsaturated Polyester

Maleic anhydride (10.8 moles), phthalic anhydride (2.7 moles), propylene glycol (7.4 moles), neopentyl glycol (7.4 moles) butyl stannoic acid (0.1 percent by weight), and hydroquinone (0.01 percent by weight) were charged to a round bottom flask which had been fitted with a steam condenser, mechanical stirrer, and a nitrogen sparge tube. The solution was slowly heated to 170° C. After holding for about two hours at 170° C., the solution was heated to 210° C. After 10.7 moles of water had been collected and an acid value of less than 30 had been achieved, the solution was Cooled and reduced to 70 percent total solids by weight with styrene.

EXAMPLE B

Crosslinking of the Unsaturated Polyester of Example A to Prepare the Flatting Agent 926 grams 95% ethanol and 175 grams water were charged to a round bottom flask and the solution was heated to reflux. A solution consisting of 82.6 grams polyester of Example A, 33.1 grams styrene, and 4.8 grams dimethylaminoethyl methacrylate (DMAEMA) was added to the refluxing solvent over thirty minutes. Simultaneously, a solution of 2.5 grams Lupersol 575™[1] and 6 grams ethanol was added to the refluxing solvent. Five minutes after the additions began, a white precipitate began to form. After a two hour hold, an additional 49.6 grams polyester, 19.8 grams styrene, and 2.9 grams DMAEMA were added over thirty minutes. Simultaneously, 1.5 grams Lupersol 575™ in 6.0 grams ethanol were added to the flask. Two hours after the second addition was Complete, an additional 55.8 grams of the polyester of EXAMPLE A, 22.3 grams styrene, and 3.3 grams DMAEMA were added to the flask over 30 minutes. Simultaneously, a separate feed consisting of 1.7 grams Lupersol 575™ in 6.0 grams ethanol was added to the flask. After a thirty minute hold, 2.8 grams Lupersol 575™ were added to the flask in two portions with a 45 minute hold between the additions. 944 grams deionized water were then added to the solution while 944 grams distillate were collected. The solution was then allowed to settle and decanted, resulting in a white powder at approximately 40% solids.

[1]Lupersol 575™ is t-amylperoxy 2-ethyl-hexanoate commercially available from Elf Atochem.

Example C

In this example a commercially available unsaturated polyester was crosslinked to prepare a microparticulate flatting agent according to the present invention 933 grams ethanol and 233 grams deionized water were charged to a round bottom flask and the solution was heated to reflux. One third of a solution consisting of 373.4 grams AROPOL Q6585[1], 149.3 grams styrene, and 33.4 grams dimethylaminoethyl methacrylate was added to the refluxing solvent over 30 minutes. Simultaneously, one third of a solution consisting of 44.5 grams Lupersol 11™[2] and 20 grams ethanol was added to the solvent over 30 minutes. After a one hour hold, an additional one third of the polyester-styrene solution and one third of the Lupersol 11™ solution were added to the flask over 30 minutes. After an additional one hour hold, the remaining polyester solution and the remaining Lupersol 11™ solution were added to the flask. After a one hour hold, one half of a solution consisting of 7.4 grams Lupersol 11™ and 12.0 grams ethanol were added to the flask. After a 45 minute hold, the remaining solution was added to the flask. After an additional 45 minute hold, 1,015 grams water were added to the solution while 1,015 grams distillate were collected. The resultant solution was centrifuged to yield a product having approximately 75% solids.

[1]Lupersol 11™ is t-butylperoxypivalate commercially available from Elf Atochem.
[2]AROPOL 6585™ is an unsaturated polyester thinned in styrene having a acid value between about 15 and about 20, commercially available from Ashland Chemical.

| Pigment Paste with Polyester Flatting Agent of EXAMPLE B | |
|---|---|
| Ingredients | Parts by Weight |
| Grind Resin #1[a] | 481 |
| Grind Resin #2[b] | 18 |
| Titanium Dioxide | 380 |
| Carbon Black[c] | 10 |
| Lead Silicate | 43 |
| Polyester Flatting Agent of EXAMPLE B | 120 |
| Tin Catalyst Paste[d] | 118 |
| Deionized Water | 116 |

[a]Grind Resin #1 is an acid neutralized ternary sulfonium based polyepoxide resin prepared as generally described in U.S. Pat. No. 4,715,898 EXAMPLE 4 from the following materials: 52.89% EPON 828 polyepoxide commercially available from Shell Chemical; 19.80% Bisphenol A; 13.29% dimethylolpropionic acid; 12.12% thiodiethylene glycol; 1.90% nonyl phenol; 87.94% deionized water; 9.65% propylene glycol monobutyl ether; 2.41% propylene glycol monomethyl ether and 0.05% ethyltriphenol phosphonium iodide. The resin was prepared at 32.6% solids.
[b]Grind Resin #2 is an acid neutralized quaternary ammonium based polyepoxide resin prepared as shown in Examples i and ii below.?
[c]Beaded carbon black commercially available from Cabot as CSX-333.
[d]Prepared from 236 grams of Grind Resin #2, 330 grams of dibutyltinoxide and 434 grams of deionized water. The paste was ground in a sand mill to a particle size of 12 microns determined by a Hegman grind gauge. The paste had a pigment/binder ratio of 2.5:1 and a total solids content of 46%.

The aforelisted ingredients were premixed and ground in a sand mill with 1400 grams of ceramic grinding beads for three hours to a particle size of 12 microns determined with a Hegman grind gauge, a pigment/binder ratio of 3:1, and a final theoretical solids of 54%.

Example i

Preparation of a Quaternizing Agent

A quaternizing agent for use in preparing a pigment grinding vehicle was prepared from the following mixture of ingredients:

| Ingredients | Parts by Weight |
| --- | --- |
| 2-ethylhexanol monourethane toluene diisocyanate in methyl isobutyl ketone | 320 |
| Dimethylethanolamine | 87.2 |
| 88% Aqueous lactic acid solution | 117.6 |
| 2-butoxyethanol | 39.2 |

The 2-ethylhexanol monourethane toluene diisocyanate was added to the dimethylethanolamine in a suitable reaction vessel at room temperature. The mixture exothermed and was stirred for 1 hour at 80° C. Lactic acid was then charged followed by the addition of 2-butoxyethanol. The reaction mixture was stirred for about 1 hour at 65° C. to form the desired quaternizing agent.

Example ii

Preparation of a Pigment Grind Vehicle

A pigment grinding vehicle was prepared from the following charge:

| Ingredient | Parts by Weight |
| --- | --- |
| EPON 829[1] | 710.0 |
| Bisphenol A | 289.6 |
| 2-ethylhexanol monourethane of 2,4-toluene diisocyanate in methyl isobutyl ketone | 406.4 |
| Quaternizing agent from Example ii | 496.3 |
| Deionized water | 71.2 |
| Butyl CELLOSOLVE[2] | 56.8 |

[1]Epoxy resin solution made from reacting epichlorohydrin and Bisphenol A having an epoxy equivalent weight of approximately 185–205, commercially available from Shell Chemical Company.
[2]Ethylene glycol monobutyl ether.

The EPON 829 and Bisphenol A were charged under a nitrogen atmosphere to a suitable reaction vessel and heated to 150°–160° C. to initiate an exotherm. The reaction mixture was permitted to exotherm for 1 hour at 150°–160° C. The reaction mixture was then cooled to 120° C. and the 2-ethylhexanol monourethane toluene diisocyanate added. The temperature of the reaction mixture was held at 110°–120° C. for 1 hour, followed by the addition of the butyl CELLOSOLVE. The reaction mixture was then cooled to 85°–90° C., homogenized and then charged with water, followed by the addition of the quaternizing agent. The temperature of the reaction mixture was held at 80°–85° C. until an acid value of one was obtained.

Example 1

This example illustrates an aqueous cationic electrodepositable coating composition which contains the polyester flatting agent of EXAMPLE B above according to the present invention.

| Ingredient | Parts by Weight |
| --- | --- |
| Resinous Composition[a] | 1739 |
| Pigment Paste of EXAMPLE I | 286 |
| Deionized Water | 1975 |

[a]Commercially available from PPG Industries, Inc. as E6117. This composition is a blend of acid solubilized amine functional polyepoxide resin, blocked isocyanate curing agent and additives.

The composition, having a pigment/binder ratio of 0.16:1 and a total solids content of 21%, was prepared by blending the ingredients under agitation and subsequently purging 30% of the total bath weight by ultrafiltration to reduce the conductivity to less than 2,000 microseconds. Bare untreated cold rolled steel panels were electrocoated at a bath temperature of 90° F. (32° C.) and 210 volts D.C.. Two sets of test panels were identically prepared, with one set baked at 330° F. (166° C.) for 30 minutes and the second set baked at 340° F. (171° C.) for 30 minutes. The applied film thickness was between 30–35 microns. The composition was evaluated as detailed below.

COMPARATIVE EXAMPLES

Comparative Example II

This example illustrates the preparation of a pigment paste containing silica, a conventional flatting agent, which was formulated into the comparative aqueous cationic electrodepositable coating composition of EXAMPLE 2 below

| Ingredients | Parts by Weight |
| --- | --- |
| Grind Resin #1 of [a] above | 481 |
| Grind Resin #2 of [b] above | 18 |
| Titanium Dioxide | 380 |
| Carbon Black of [c] above | 10 |
| Lead Silicate | 43 |
| Tin Catalyst Paste of [d] above | 118 |
| Silica[e] | 48 |
| Deionized Water | 116 |

[e]A wax encapsulated silica commercially available from Degussa as OK-412.

The aforelisted ingredients with the exception of the silica were combined with agitation and ground in a sand mill with 1400 grams of ceramic grinding beads for 3 hours to a particle size of 12 microns determined with a Hegman grind gauge. The silica was then added and the paste ground further to a particle size of 12 microns. The final pigment paste had a pigment/binder ratio of 3:1 and a final theoretical solids of 57%.

Comparative Example 2

This example illustrates the formulation of a aqueous cationic electrodepositable coating composition using the silica of EXAMPLE II above

| Ingredients | Parts by Weight |
|---|---|
| Resinous Composition of ª above | 1739 |
| Pigment Paste of EXAMPLE II above | 286 |
| Deionized Water | 1975 |

The composition, having a pigment/binder ratio of 0.16:1 and a total solids content of 21%, was prepared, applied and baked as described above in EXAMPLE 1.

EVALUATION

The aqueous cationic electrodepositable coating compositions detailed above in EXAMPLES 1 and 2 were evaluated for gloss and corrosion resistance as detailed below.

The evaluation tests below measured loss of paint adhesion and corrosion of the base metal from a scribe line after repeated exposure to immersion in salt solution, dry-off, humidity, and freezing. The two test methods mentioned below each employed a different combination of these exposures.

Prior to corrosion testing, the cured films, as visually evaluated, were smooth, uniform and had good appearance. The gloss was measured at 60 degrees using a Labtron glossmeter from BYK according to ASTM Method D523-62T. The gloss measured for each coating was 88. The coated panels were evaluated for corrosion resistance by the following test methods. Test A is the General Motors Test Method 54-26 "Scab Corrosion Creepback of Paint Systems on Metal Substrates" as detailed in General Motors Engineering Materials and Process Standards available from General Motors Corporation. Test B is the "Warm Salt Water Test" according to Honda Motors which is conducted in the following manner. An incision was made to the test panel with a sharp knife cutting the paint film through to the bare metal followed by immersion of the panel, in a 5% sodium chloride solution conditioned to 55° C., for a period of 120 hours. The panel was removed after immersion, rinsed with water and allowed to air dry. Cellophane tape was pressed onto this scribed area and then picked off by grasping the edge of the tape and rapidly removing it by stripping upward from the surface. The greatest width of the paint film which adhered to the tape was recorded.

For Test A, evaluation was conducted only on a test panel baked at 340° F. (171° C.). For Test B, evaluation was conducted on test panels baked at both 330° F. (166° C.) and 340° F (171° C.). Panels were examined after 20 cycles as described in the test method for Test A, and after 120 hours for Test B. The results of this testing are shown in Table 1 below.

TABLE 1

| | Paint Creep from the Scribe | | |
|---|---|---|---|
| | Bake Temperature/Time | EXAMPLE 1 | EXAMPLE 2 |
| Test A | 340° F. (171° C.)/30 min | 8 mm | 22 mm |
| Test B | 330° F. (166° C.)/30 min | 6 mm | 9 mm |
| Test B | 340° F. (171° C.)/30 min | 1.5 mm | 3 mm |

We claim:

1. An aqueous electrocoating composition comprising
   (a) an electrodepositable water dispersible polymer, and
   (b) a microparticulate crosslinked unsaturated polyester product of precipitation from a liquid medium that is comprised of organic solvent as the major component, the product being present in the composition in an amount effective to provide flatting of a cured film of the aqueous electrocoating composition on a substrate.

2. The composition of claim 1 wherein the aqueous electrocoating composition further comprises a curing agent adapted to crosslink the polymer of (a).

3. An aqueous cationic electrocoating composition comprising
   (a) a cationic electrodepositable water dispersible polymer, and
   (b) a microparticulate crosslinked unsaturated polyester product of precipitation from a liquid medium that is comprised of organic solvent as the major component, the product being present in the composition in an amount effective to provide flatting of a cured film of the aqueous cationic electrocoating composition on a substrate.

4. The composition of claim 3 wherein the aqueous cationic electrocoating composition further comprises a curing agent adapted to crosslink the polymer of (a).

5. The composition of claim 4 wherein the unsaturated polyester prior to crosslinking is prepared from monomers comprising an ethylenically unsaturated polycarboxylic acid or anhydride and a polyhydric alcohol.

6. The composition of claim 5 wherein the unsaturated polyester is prepared from monomers additionally comprising a saturated dicarboxylic acid or anhydride.

7. The composition of claim 4 wherein the unsaturated polyester prior to crosslinking has a weight average molecular weight from about 1,000 to about 50,000.

8. The composition of claim 7 wherein the unsaturated polyester prior to crosslinking has a weight average molecular weight of from about 1,500 to about 10,000.

9. The composition of claim 8 wherein the unsaturated polyester prior to crosslinking has a weight average molecular weight from about 2,000 to about 5,000.

10. The composition of claim 4 wherein the unsaturated polyester prior to crosslinking has an acid value of from about 20 to about 50.

11. The composition of claim 10 wherein the unsaturated polyester prior to crosslinking has an acid value from about 25 to 35.

12. The composition of claim 4 wherein the microparticulate crosslinked unsaturated polyester is prepared at a total solids of from about 25 percent by weight to about 90 percent by weight.

13. The composition of claim 4 wherein the microparticulate crosslinked unsaturated polyester as prepared has a particle size ranging from about 5 microns to about 1,000 microns.

14. The composition of claim 4 wherein the unsaturated polyester is crosslinked by solution polymerization and precipitation.

15. The composition of claim 14 wherein the unsaturated polyester is crosslinked with an ethylenically unsaturated monomer or monomers.

16. The composition of claim 15 wherein the unsaturated polyester is crosslinked with a mixture of styrene and dimethylaminoethyl methacrylate.

17. The composition of claim 14 wherein the microparticulate crosslinked unsaturated polyester product is the product of solution polymerization conducted in a solvent blend of a major portion of alcohol and a minor portion of water using a free radical catalyst.

18. The composition of claim 17 wherein the microparticulate crosslinked unsaturated polyester is the product of precipitation by dilution with water to achieve a minority of alcohol and a majority of water, and the product recovered by removal of the solvent.

19. The composition of claim 4 wherein the curing agent is a polyisocyanate.

20. The composition of claim 19 wherein the water dispersible polymer is an acid solubilized amine functional polyepoxide.

21. The composition of claim 20 wherein the amount of polyisocyanate curing agent ranges from about 10 percent to about 75 percent by weight, the percentage based on the total weight of the resin solids of the composition.

22. The coating composition of claim 4 wherein the amount of (b) ranges from about 0.5 percent to about 30 percent, the percent based on total weight of (a) and the curing agent.

23. A method of electrocoating an electroconductive substrate serving as a charged electrode in an electric circuit comprising said electrode and an oppositely charged counter electrode, at least one of said electrodes being immersed in an aqueous electrocoating composition comprising a water dispersible polymer, said method comprising passing electric current between said electrodes to cause deposition of the electrocoating composition on the substrate as a substantially continuous film and drying or heating the electrodeposited film at elevated temperatures to form an at least a partially cured film, said aqueous electrocoating composition comprising (a) an electrodepositable water dispersible polymer, and (b) a microparticulate crosslinked unsaturated polyester product of precipitation from a liquid medium that is comprised of organic solvent as the major component, the product being present in the composition in an amount effective to provide flatting of a cured film of the electrocoating composition on a substrate.

24. The method of claim 23 wherein the aqueous electrocoating composition additionally comprises a curing agent adapted to crosslink the polymer of (a).

25. A method of electrocoating an electroconductive substrate serving as a cathode in an electrical circuit comprising an anode and said cathode immersed in an aqueous cationic electrocoating composition, comprising a cationic water dispersible polymer said method comprising passing electric current between the cathode and the anode to cause the deposition of electrocoating composition on the cathode as a substantially continuous film and heating the electrodeposited film at an elevated temperature to form an at least partially cured film, said aqueous cationic electrocoating composition comprising:

a. a cationic electrodepositable water dispersible polymer, b. a microparticulate crosslinked unsaturated polyester in an amount effective to provide flatting of a cured film of the electrocoating composition on a substrate.

26. The method of claim 25 additionally comprising a curing agent adapted to crosslink the polymer of (a).

* * * * *